(12) United States Patent
Krog et al.

(10) Patent No.: US 7,010,984 B2
(45) Date of Patent: Mar. 14, 2006

(54) DIFFERENTIAL PRESSURE SENSOR

(75) Inventors: Jens Peter Krog, Ulstrup (DK);
Casper Pedersen, Koobenhavn (DK);
Carsten Christensen, Bagsvaerd (DK)

(73) Assignee: Grundfos a/s, Bjrringbro (DK)

( * ) Notice: Subject to any disclaimer, the term of this patent is extended or adjusted under 35 U.S.C. 154(b) by 32 days.

(21) Appl. No.: 10/883,941

(22) Filed: Jul. 2, 2004

(65) Prior Publication Data
US 2005/0011270 A1    Jan. 20, 2005

(30) Foreign Application Priority Data
Jul. 3, 2003    (EP)    ................................. 03015055

(51) Int. Cl.
*G01L 13/02*    (2006.01)

(52) U.S. Cl. ............................. 73/716; 73/719; 73/721

(58) Field of Classification Search ................ 73/700, 73/716, 736, 719, 734, 725, 727, 721
See application file for complete search history.

(56) References Cited

U.S. PATENT DOCUMENTS

| | | | | |
|---|---|---|---|---|
| 4,777,826 A | * | 10/1988 | Rud et al. | ..................... 73/708 |
| 4,790,192 A | | 12/1988 | Knecht et al. | |
| 6,234,027 B1 | | 5/2001 | Schatz | |
| 6,813,954 B1 | * | 11/2004 | Gokhfeld | ..................... 73/718 |
| 2004/0079159 A1 | * | 4/2004 | Muchow | ..................... 73/716 |

FOREIGN PATENT DOCUMENTS

| | | |
|---|---|---|
| DE | 197 01 055 A1 | 7/1998 |
| EP | 0 083 496 | 7/1983 |

* cited by examiner

*Primary Examiner*—Edward Lefkowitz
*Assistant Examiner*—Andre Allen
(74) *Attorney, Agent, or Firm*—McGlew & Tuttle, PC

(57) ABSTRACT

The differential pressure sensor is formed of a semiconductor substrate (1) which is thinned out in an inner region into a membrane (2) which may be impinged by pressure on both sides. Measurement resistances (3a to 3d) for detecting the differential pressure ($P_1$ minus $P_2$) are formed within the membrane (2), and compensation resistances (4) are formed on the carrier, which are connected to measurement resistances (3). The measurement resistances (3) are connected into a first measurement bridge (6) and the compensation resistances (4a to 4d) into a second measurement bridge (7).

13 Claims, 2 Drawing Sheets

DIFFERENTIAL PRESSURE SENSOR

FIELD OF THE INVENTION

The invention relates to a differential pressure sensor with a carrier which in an inner region comprises a membrane which may be acted on pressure on both sides, wherein measurement resistances for detecting the differential pressure acting on the membrane are formed within the membrane.

BACKGROUND OF THE INVENTION

Such differential pressure sensors are counted as belonging to the state of the art and are formed of a semiconductor substrate which in an inner region is thinned out into a membrane. Four measurement resistances are formed in this inner region, which are connected into a measurement bridge so that on deformation of the membrane, as occurs when impinged by pressure, the pressure acting on both sides of the membrane may be determined in the form of a differential pressure whilst making use of the piezoresistive effect. Differential pressure sensors as well as simple pressure sensors with which atmospheric pressure prevails on one side function according to this principle. Such a semiconductor pressure sensor is known for example from DE 197 01 055 A1.

Since the characteristic curve of the pressure sensor changes due to temperature, it is counted as belonging to the state of the art, apart from the actual measurement resistances formed on the membrane, to arrange so-called compensation resistances in the region next to the membrane which are dimensioned such that their piezoresistive coefficients are equal with regard to magnitude. The resistances are connected in series and are arranged such that their changes due to temperature are compensated.

From EP 0 083 496 B1 it is counted as belonging to the state of the art to arrange the measurement resistances and compensation resistances in each case parallel to one another and to connect these into measurement bridges, in order in this manner to compensate measurement errors caused by temperature. Furthermore measurement differences due to the pressure level are here too compensated by the circuit arrangement. However with the arrangement known from EP 0 083 496 B1 the compensation resistances lie outside the membrane region, and specifically where the semiconductor substrate is to be regarded as practically rigid due to a glass tube attached perpendicularly thereto.

The sensor known from DE 197 01 055 A1 as well as from EP 0 083 496 B1 may be applied as a differential pressure sensor, but however in practice is provided for a pressure measurement with respect to the atmospheric pressure acting on the membrane on one side, and thus are not suitable for measuring a differential pressure deviating from this.

For controlling heating circulatory pumps it is counted as belonging to the state of the art to apply a differential pressure senor in the heating circuit in order in this manner to detect the load condition of the heating installation and to control the heating circulatory pump accordingly. At the same time the differential pressure is a measure for the setting of the thermostat valves and thus for the heat requirement of the installation. The system pressure prevailing in the region of the pump differs very considerably depending on the position of installation and the design of the heating, even though the differential pressures lie roughly at the same level.

It is particularly desirable in the previously mention case of application, apart from the differential pressure to detect a system pressure, since this provides information on the extent of filling of the heating installation, so that one may prevent the pump from running dry.

SUMMARY OF THE INVENTION

It is therefore the object of the present invention to design a differential pressure sensor of the known type such that one may detect a further differential pressure as simply as possible, in particular such that a detection of the absolute pressure is possible, thus a detection of pressure with respect to the ambient pressure.

This object is achieved according to the invention with a differential pressure sensor, with a carrier which in an inner region comprises a membrane which may be impinged by pressure on both sides. Measurement resistances, provided for detecting the differential pressure acting on the membrane, are formed within the membrane. Compensation resistances are formed on the carrier. The compensation resistances are connected to the measurement resistances and the measurement resistances are connected into a first measurement bridge and the compensation resistances into a second measurement bridge. Differential pressure determination means are provided to determine the differential pressure of the pressure acting on one side of the membrane and of a pressure acting on an end-face of the carrier, by way of the voltage prevailing at the second measurement bridge.

The basic concept of the invention, with a differential pressure sensor of the known type, is to use the voltage signal prevailing at the second measurement bridge in order to determine the pressure acting on one side of the membrane in relation to the pressure acting on an end-face of the carrier, for example the atmospheric pressure.

The differential pressure sensor according to the invention consists of a carrier in whose inner region a membrane is arranged which may be impinged by pressure on both sides. The carrier is advantageously formed by a semiconductor substrate which is thinned out into a membrane in an inner region. Measurement resistances for detecting the differential pressure acting on the membrane are provided within the membrane. Furthermore compensation resistances which are connected to the measurement resistances are formed on the carrier or semiconductor substrate, wherein the measurement resistances are connected into a first measurement bridge and the compensation resistances into a second measurement bridge. By way of the voltage prevailing at the second measurement bridge as well as the voltage prevailing at the first measurement bridge, according to the invention on the one hand the differential pressure on both sides of the membrane is determined and on the other hand the differential pressure between one side of the membrane and an end-face of the carrier or the semiconductor substrate is determined.

So that the carrier or the semiconductor substrate may deform as freely as possible according to the acting pressures, it is useful to fix this elastically on both sides, preferably by way of two O-rings which simultaneously ensure the sealing.

In order to be able to measure the absolute pressure which acts on one side of the membrane it is necessary to impinge the semiconductor substrate at least on one side with ambient pressure. This according to the invention may advantageously be effected outside the fixation, preferably on an end-face of the substrate. Suitable surface cross sections transverse to the deflection direction of the membrane result by way of this, on which on the one side the absolute pressure to be measured acts and on the other side the ambient pressure.

With the differential pressure sensor according to the invention, the compensation resistances may either be arranged next to the membrane but within the fixation as is also known from the state of the art. According to the invention however, the compensation resistances may also be arranged on the membrane itself. By way of this the fixation of the substrate may be effected closer to the membrane which leads to a greater measurement accuracy with low system pressures, and to a small constructional size. In a further formation of the invention it is further envisaged to not only provide the compensation resistances outside the membrane, but also outside the fixation, thus to provide them where only the atmospheric pressure acts and not one of the pressures from which the differential pressure is to be determined.

The evaluation of the absolute pressure according to the invention is effected by way of the second measurement bridge which is formed of compensation resistances. For measurement, the measurement resistances of the differential pressure sensor located on the membrane may in turn serve as compensation resistances, for example in order to compensate the temperature-dependent zero (null) drift as is specified further below in equation (2) in the last two terms by way of the pressure $P_d$.

According to the invention the absolute pressure is sensorically detected by way of the compensation resistances of the differential pressure sensor. In order to process a corresponding voltage signal or signals and to convert this or these into a signal which controls a display which displays the absolute pressure, according to the invention an electronic circuit is provided which is fed by the output voltages and which has a data output or a connection for an absolute pressure display. Such an electronic circuit may typically be a microprocessor. The data output is then usefully a digital one for controlling a corresponding digital display or for transmitting the data to a computer.

With the application of such a differential pressure sensor in a heating circulatory pump which is controlled by a frequency converter, the microprocessor which is present in any case on the frequency converter side may be used for this task in a particularly economical manner. Alternatively, according to the invention the voltages prevailing at the measurement bridges may also be processed by way of a comparatively inexpensive analog circuit whose output delivers a voltage signal which controls an analog display, typically a pointer instrument.

According to the invention, advantageously the absolute pressure is detected on that side of the substrate on which this is thinned out for forming the membrane.

The substrate is an essentially two-dimensional component of a comparatively low thickness. In order to be able to realize in particular the absolute pressure measurement according to the invention, in a manner which is simple with regard to measurement technology, it is useful to select the ratio between the substrate surface area and the membrane surface area between 3 and 30, preferably in the region of about 16.

The thickness ratios between the substrate and the thinned out region of the membrane is also significant, in particular for the absolute pressure measurement. Here one preferably selects a thickness ratio between the thickness of the substrate and the thickness of the membrane which is between 10 and 200, preferably about 25.

The measurement range or the measurement accuracy of the differential pressure sensor according to the invention, in particular with regard to the differential pressure which is also to be determined, may be increased by way of profiling the membrane or by designing it with a differing thickness.

The differential pressure sensor according to the invention in particular is advantageously integrated in a heating circulatory pump unit, but may also be used in other applications where the differential pressure prevailing between two fluids, as well as on one side, an absolute pressure with respect to the atmospheric pressure or a third pressure (not atmospheric pressure) is to be determined.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The invention is hereinafter described in more detail by way of one embodiment example shown in the drawings. In the drawings.

DETAILED DESCRIPTION OF THE INVENTION

Figure 1:
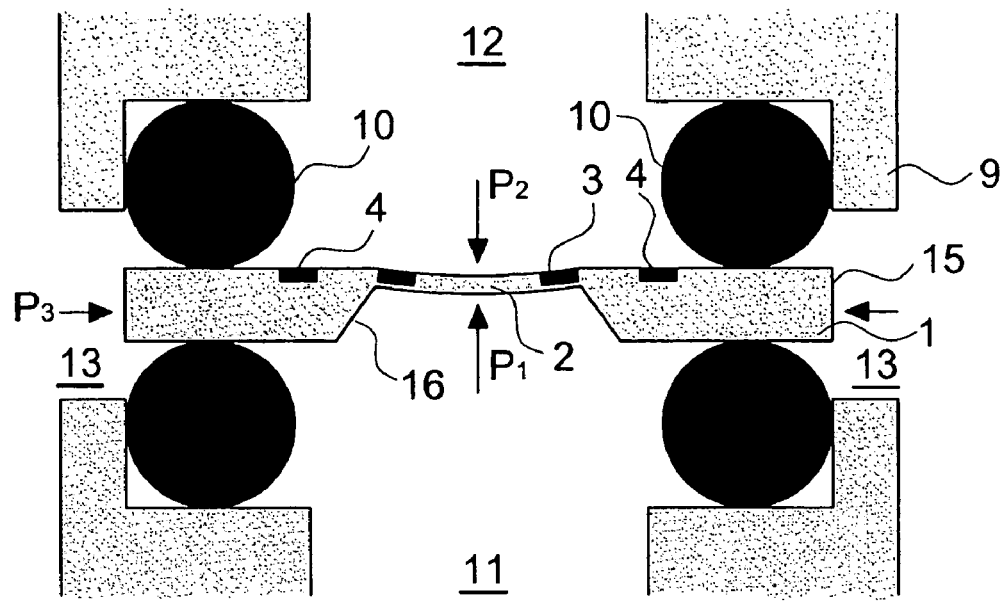
FIG. 1 is a schematic enlarged sectional representation showing a pressure sensor according to the invention.
Figure 2:
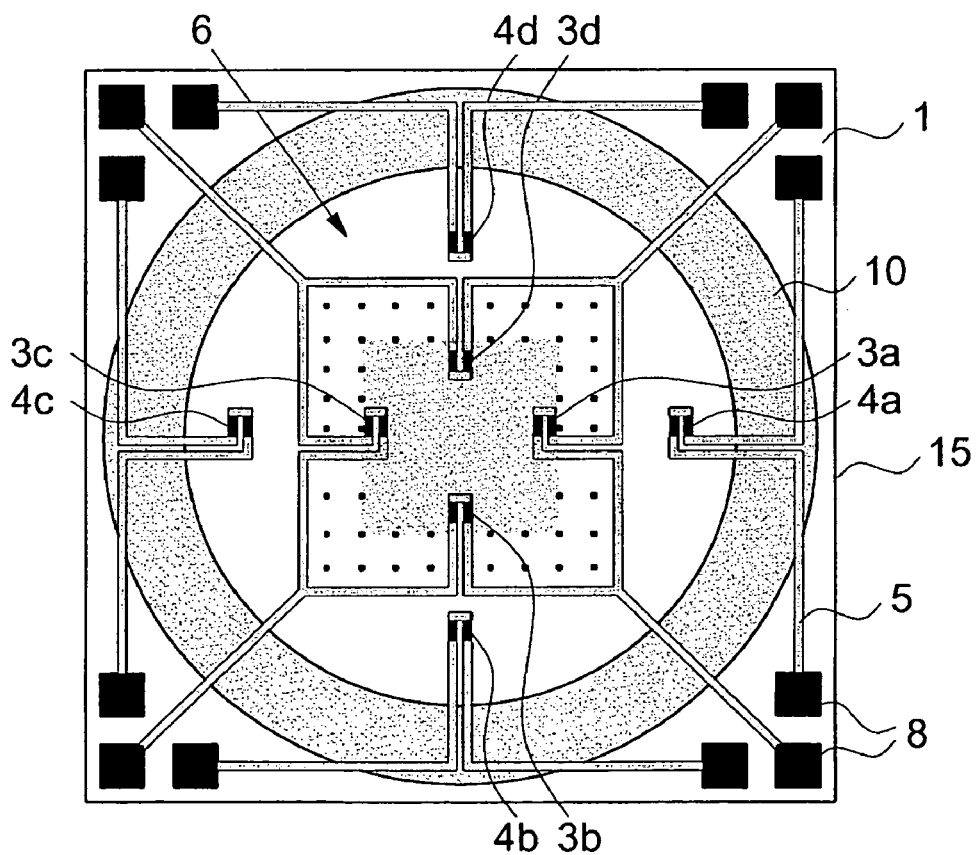
FIG. 2 is a plan view of the substrate forming the actual sensor.

Referring to the drawings in particular, a differential pressure sensor as represented in FIGS. 1 and 2 is comprised of an essentially two-dimensionally formed semiconductor substrate 1 which in a middle region on the one side is thinned out into a membrane 2. Four measurement resistances 3a to 3d are formed in the known manner in the region of the membrane 2. Four further resistances in the form of compensation resistances 4a to 4d are formed directly next to the membrane 2 on the same side of the substrate. The arrangement of the resistances 3, 4 on the substrate 1 is to be deduced in detail from FIG. 2. Accordingly, the resistances 3, 4 are in each case arranged in a cross-like manner, wherein a compensation resistance 4 is allocated to each measurement resistance 3, and the compensation resistance runs in a direction parallel to the measurement resistance. The measurement resistances 1 are arranged directed parallel to one another as indeed are the compensation resistances 4, i.e. all resistances 3, 4 are arranged in the same direction.

The resistances 3a to 3d one the one hand as well as 4a to 4d on the other hand are in each case connected to one another into a measurement bridge via strip conductors 5, and specifically the measurement resistances 3 into a first measurement bridge 6 and the compensation resistances 4 into a second measurement bridge 7. Whilst the circuiting of the first measurement bridge 6 is effected completely on the substrate 1, for the circuiting of the second measurement bridge 7 a circuiting outside of substrate is additionally required so that a circuit diagram results as is shown in FIG.

3. In the edge region of the substrate, the strip conductors 5 are provided with aluminum contacts 8 where an electrical lead may be connected by way of welding.

The substrate 1 is mounted within a sensor housing 9 which here is not shown in detail, which for example is part of a pump unit, another unit or may be designed separately. Within the sensor housing 9, the substrate 1 is elastically fixed by way of two O-rings 10 in a manner sealed with respect to the housing 9. The sensor housing 9 comprises at least 3 openings, and specifically a first opening 11 via which a fluid with a pressure $P_1$ may be led, a second opening 12 via which a fluid with a pressure $P_2$ may be led and a third opening 13 via which a fluid with a pressure $P_3$ may be led. The openings 11 and 12 are formed in a manner known per se which is common to differential pressure sensors of this type, wherein the pressure $P_1$ prevails at the thinned-out part of the substrate 1 on the membrane 12, whereas the pressure $P_2$ prevails oppositely on the other side, specifically on the side on which also the resistances 3 and 4 are formed. The pressure $P_3$ prevails laterally. Since with the described differential pressure sensor the pressure $P_1$ is to be measured as an absolute pressure, $P_3$ the atmospheric pressure is to be taken into account. The opening 13 of the sensor housing 9 is thus arranged such that a channel connection to the outer atmosphere exists.

The thus formed sensor on the one hand is designed in the known manner to determine the differential pressure $P_1$ minus $P_2$, and is furthermore suitable for also determining the absolute pressure of $P_1$ with respect to the atmospheric pressure $P_3$. For this, the surface portions of the substrate 1 which are formed perpendicular to the membrane are used, specifically the outer end-faces 15 of the substrate 1 as well as the obliquely running inner end-faces 16 of the substrate, where the substrate 1 is thinned towards the membrane 2. The components of the pressure $P_1$ directed transversely to the membrane act oppositely to the atmospheric pressure $P_3$ acting on the end-face 15. Thus also a deformation depending on the prevailing pressures $P_1$ and $P_3$ is effected on account of the elastic fixing-in of the membrane.

Figure 3:
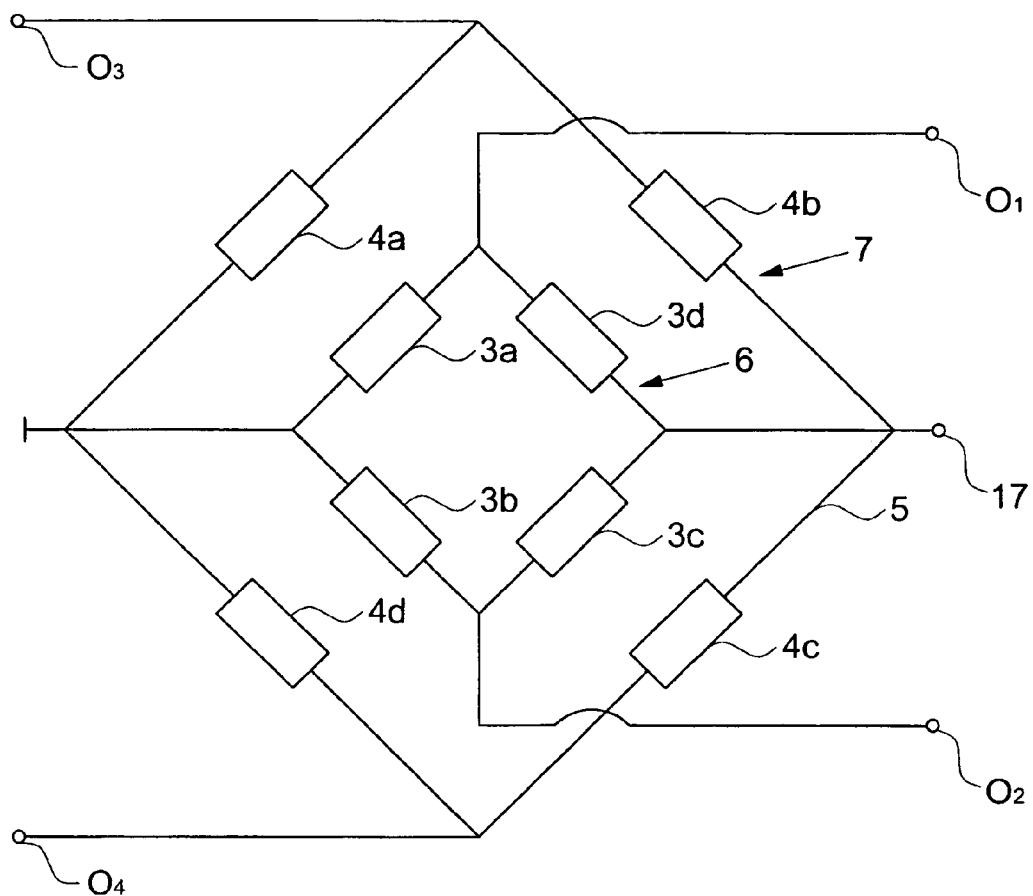
FIG. 3 is a circuit diagram which shows the electrical connection of the measurement and compensation resistances.

The electrical connection of the resistances 3a to 3d and 4a to 4d is to be deduced in detail from FIG. 3. As FIG. 3 illustrates, the first measurement bridge 6 may be tapped at the connections $O_1$ and $O_2$, wherein the second measurement bridge 7 may be tapped at the connections $O_3$ and $O_4$. All resistances 3, 4 are in each case connected in pairs to a current source 17 which subjects the measurement bridges 6 and 7 to a constant current I. Then a voltage measurement is effected at the connections $O_1$ to $O_4$ so that as a whole four voltages $O_1$ to $O_4$ are to be determined. The evaluation of the differential pressure by way of this circuit is counted as belonging to the state of the art and is therefore not described further in detail here. With respect to this, the initially specified state of the art is referred to.

Figure 4:
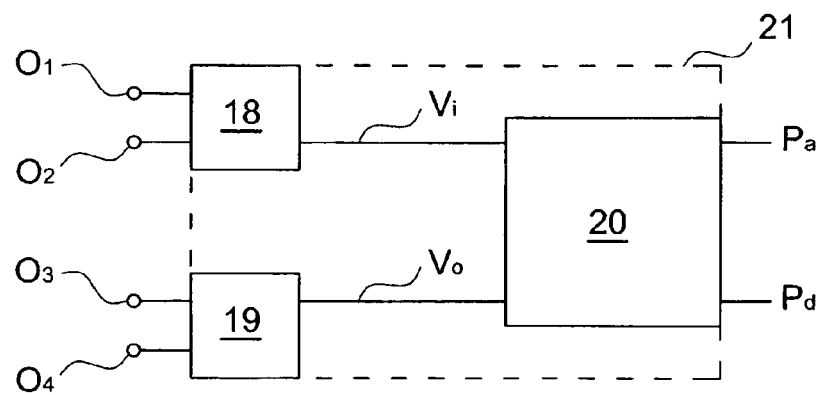
FIG. 4 is a block diagram which illustrates the digital signal processing.

As FIG. 4 illustrates, the voltages $O_1$ and $O_2$ as well as $O_3$ and $O_4$ are subtractively combined with one another. The subtractive combinations are characterized in the block diagram according to FIG. 4 at 18 and 19 respectively and combine the voltages $O_1$ to $O_4$ as follows:

$$O_2 - O_1 = V_i$$

$$O_4 - O_3 = V_o$$

wherein $V_i$ represents a voltage of the inner measurement bridge 6 and $V_o$ a voltage of the outer measurement bridge 7. The voltages $V_i$ and $V_o$ have the following relationship with the differential pressure $P_d$ to be determined and to absolute pressure $P_a$ to be determined:

$$V_i = k_1 \cdot I_1 \cdot P_d + I_1 \cdot k_2 + I_1 \cdot k_3 \cdot P_a + k_4 \cdot I_1 \cdot P_a \cdot P_d \tag{1}$$

$$V_o = k_5 \cdot I_2 \cdot P_a + I_2 \cdot k_6 + I_2 \cdot k_7 \cdot P_d + k_8 \cdot I_2 \cdot P_a \cdot P_d \tag{2}$$

wherein $I_1$ and $I_2$ are the currents flowing through the bridges 6 and 7 and $k_1$ to $k_8$ are constants, which may be determined in a sensor-specific or empirical manner. The constants are determined on the part of the factory after manufacture of the sensor in a type of calibration process.

In the previously described embodiment example, $I_1$ and $I_2$ are equal since both measurement bridges 6, 7 are subjected to the same current I. It may however be useful for improving the measurement accuracy to subject the measurement bridges 6 and 7 with different currents. These different currents $I_1$ and $I_2$ are then also to be taken into account in a calculated manner.

By way of the above equations, the absolute pressure $P_a$ and the differential pressure $P_d$ may either be determined by calculation or also in another suitable manner, for example interactively. The evaluation of $P_a$ and $P_d$ by way of $V_i$ and $V_o$ is indicated in FIG. 4 at 20. The combination 18 and 19 as well as the evaluation of $P_a$ and $P_d$ in 20 is effected in the present embodiment example according to FIG. 4 digitally by way of an electronic circuit 21 but may also however be effected in an analog manner by way of a suitable analog circuit.

In the previously described embodiment example an iteration process is carried out in the computation unit 20 which is based on the two previously mentioned equations (1) and (2). At the same time it is assumed that the differential pressure $P_d$ is independent of the absolute pressure. The differential pressure $P_d$ is then evaluated by way of the equation (1), wherein the term which has the absolute pressure is set to zero. The absolute pressure $P_a$ is the evaluated with the thus computed differential pressure $P_d$ by way of the equation (2) by way of substituting the value for $P_d$ determined by way of the equation (1) into equation (2). The thus computed absolute pressure $P_a$ is again substituted into equation (1) in order again to evaluate the differential pressure $P_d$. This is effected until the deviations from $P_a$ or $P_d$ exceed these iterative approximations by a predefined amount.

The thus evaluated absolute pressure $P_a$ as well as the simultaneously evaluated differential pressure $P_d$ prevails in digital form at the output of the electronic circuit 21. With an analog circuit a corresponding voltage signal prevails at the output, which controls two electrical display instruments of which one displays the absolute pressure and the other the differential pressure.

With the previously mentioned embodiment example the membrane has a constant thickness and is formed in a plane manner. It may however also be advantageous to design the membrane partially reinforced or to apply a profiled membrane or a membrane with a profiled surface in order to adapt the sensor for special application purposes.

While a specific embodiment of the invention has been shown and described in detail to illustrate the application of the principles of the invention, it will be understood that the invention may be embodied otherwise without departing from such principles.

APPENDIX

List of Reference Numerals
1—substrate
2—membrane
3—measurement resistances
4—compensation resistances
5—strip conductors
6—first inner measurement bridge
7—second inner measurement bridge
8—aluminum contacts
9—sensor housing
10—O-rings
11—first opening in the sensor housing
12—second opening in the sensor housing
13—third opening in the sensor housing
15—outer end-faces
16—inner end-faces
17—current source
18—subtractive combination
19—subtractive combination
20—algorithm
21—electronic circuit

What is claimed is:

1. A differential pressure sensor, comprising: a carrier having an inner region comprising a membrane that may be impinged by pressure on both sides; measurement resistances for detecting the differential pressure acting on the membrane, said measurement resistances being formed within the membrane; compensation resistances formed on the carrier, said compensation resistances being connected to the measurement resistances and the measurement resistances are connected into a first measurement bridge and the compensation resistances are connected into a second measurement bridge; and differential pressure determination means to determine the differential pressure of the pressure acting on one side of the membrane and of a pressure acting on an end-face of the carrier, by way of the voltage prevailing at the second measurement bridge.

2. A differential pressure sensor according to claim 1, wherein the carrier is formed by a semiconductor substrate which is thinned in an inner region into the membrane.

3. A differential pressure sensor according to claim 1, wherein there is a fixation of the semiconductor substrate to elastically fix-in the substrate on both sides between two O-rings.

4. A differential pressure sensor according to claim 3, wherein the semiconductor substrate at one side, at an end-face lying outside the fixation, is impinged with the ambient pressure.

5. A differential pressure sensor according to claim 1, wherein the compensation resistances are arranged in the region of the membrane.

6. A differential pressure sensor according to claim 3, wherein the compensation resistances lie outside the fixation of the carrier.

7. A differential pressure sensor according to claim 1, wherein on detecting the absolute pressure the measurement resistances are applied as compensation resistances.

8. A differential pressure sensor according to claim 1, wherein the means for determining the absolute pressure are formed by an electronic circuit with at least one data output and/or connection for a pressure display.

9. A differential pressure sensor according to claim 1, wherein the ratio between the substrate surface area and the membrane surface area lies between 3 and 30.

10. A differential pressure sensor according to claim 9, wherein the ratio between the substrate surface area and the membrane surface area lies at about 16.

11. A differential pressure sensor according to claim 1, wherein the ratio between the substrate thickness and the thickness of the membrane is between 10 and 200.

12. A differential pressure sensor according to claim 11, wherein the ratio between the substrate thickness and the thickness of the membrane is about 25.

13. A differential pressure sensor according to claim 1, wherein the membrane is profiled or is formed with a differing thickness.

* * * * *